(12) United States Patent
Thukral et al.

(10) Patent No.: US 12,182,510 B2
(45) Date of Patent: Dec. 31, 2024

(54) UNIDIRECTIONAL TEXT COMPARISON

(71) Applicant: INTERNATIONAL BUSINESS MACHINES CORPORATION, Armonk, NY (US)

(72) Inventors: Mehul Thukral, New York, NY (US); Raj Nagesh, Cary, NC (US); Saksham Gandhi, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 271 days.

(21) Appl. No.: 17/653,912

(22) Filed: Mar. 8, 2022

(65) Prior Publication Data

US 2023/0289526 A1    Sep. 14, 2023

(51) Int. Cl.
| | | |
|---|---|---|
| *G06F 17/00* | (2019.01) | |
| *G06F 16/903* | (2019.01) | |
| *G06F 40/205* | (2020.01) | |
| *G06F 40/284* | (2020.01) | |
| *G06V 30/19* | (2022.01) | |

(52) U.S. Cl.
CPC ...... *G06F 40/284* (2020.01); *G06F 16/90344* (2019.01); *G06F 40/205* (2020.01); *G06V 30/19093* (2022.01)

(58) Field of Classification Search
None
See application file for complete search history.

(56) References Cited

U.S. PATENT DOCUMENTS

| | | |
|---|---|---|
| 6,173,251 B1 | 1/2001 | Ito . |
| 10,789,533 B2 | 9/2020 | Clark |
| 11,327,960 B1* | 5/2022 | Jin ...................... G06F 16/2468 |
| 11,687,723 B2 | 6/2023 | Nagesh |
| 2003/0028566 A1 | 2/2003 | Nakano |
| 2011/0055192 A1 | 3/2011 | Tang |
| 2020/0151244 A1* | 5/2020 | Rastogi ................. G06F 40/194 |
| 2021/0294979 A1* | 9/2021 | Nagesh ................. G06F 40/194 |
| 2022/0229980 A1* | 7/2022 | Jin ......................... G06N 3/044 |

FOREIGN PATENT DOCUMENTS

| | | |
|---|---|---|
| CN | 106454678 A | 3/2017 |
| CN | 106484678 A | 3/2017 |
| CN | 107562824 B | 1/2018 |

(Continued)

OTHER PUBLICATIONS

Accenture, "Unlocking Value from Unstructured Data", http://www.accenture.com/be-en/insights/digital/unlocking-value-unstru . . . , Aug. 2, 2019, pp. 1-7.

(Continued)

*Primary Examiner* — Satwant K Singh
(74) *Attorney, Agent, or Firm* — Kristofer Haggerty

(57) ABSTRACT

A method, a structure, and a computer system for unidirectional text comparison. The exemplary embodiments may include determining a first similarity score between a first text string and a second text string, and computing an error term between the first text string and the second text string, wherein the error term incorporates a directionality of the first text string and the second text string. The exemplary embodiments may further include determining a second similarity score based on the first similarity score and the error term.

20 Claims, 7 Drawing Sheets

(56) References Cited

FOREIGN PATENT DOCUMENTS

| | | |
|---|---|---|
| CN | 108647299 A | 10/2018 |
| CN | 109271641 A | 1/2019 |
| CN | 112926299 A | 6/2021 |

OTHER PUBLICATIONS

Mell et al., "The NIST Definition of Cloud Computing", National Institute of Standards and Technology, Special Publication 800-145, Sep. 2011, pp. 1-7.

Anonymous, "ODSC West 2021", Open Data Science Conference, Nov. 15-18, 2021, 22 pages, <https://web.archive.org/web/20210330222018/https://odsc.com/california/>.

Nelson, Paul, "Unlocking value from unstructured data", Accenture Applied Intelligence, Aug. 2, 2019, 6 pages, <https://web.archive.org/web/20210419172016/https://www.accenture.com/be-en/insights/digital/unlocking-value-unstructured-data>.

* cited by examiner

UNIDIRECTIONAL TEXT COMPARISON

BACKGROUND

The exemplary embodiments relate generally to natural language processing, and more particularly to unidirectional text comparison in natural language processing.

Using word embeddings for text comparison in natural language processing (NLP) compares two blocks of text using a cosine similarity mathematical equation and computes a score that is used to describe the difference between the two blocks. Currently, there is no mechanism to compute the text comparison from a unidirectional perspective, i.e., if Text A covers most of the aspects covered in Text B, the overall similarity score is not penalized based on Text B having additional text.

SUMMARY

The exemplary embodiments disclose a method, a structure, and a computer system for unidirectional text comparison. The exemplary embodiments may include determining a first similarity score between a first text string and a second text string, and computing an error term between the first text string and the second text string, wherein the error term incorporates a directionality of the first text string and the second text string. The exemplary embodiments may further include determining a second similarity score based on the first similarity score and the error term.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Figure 1:
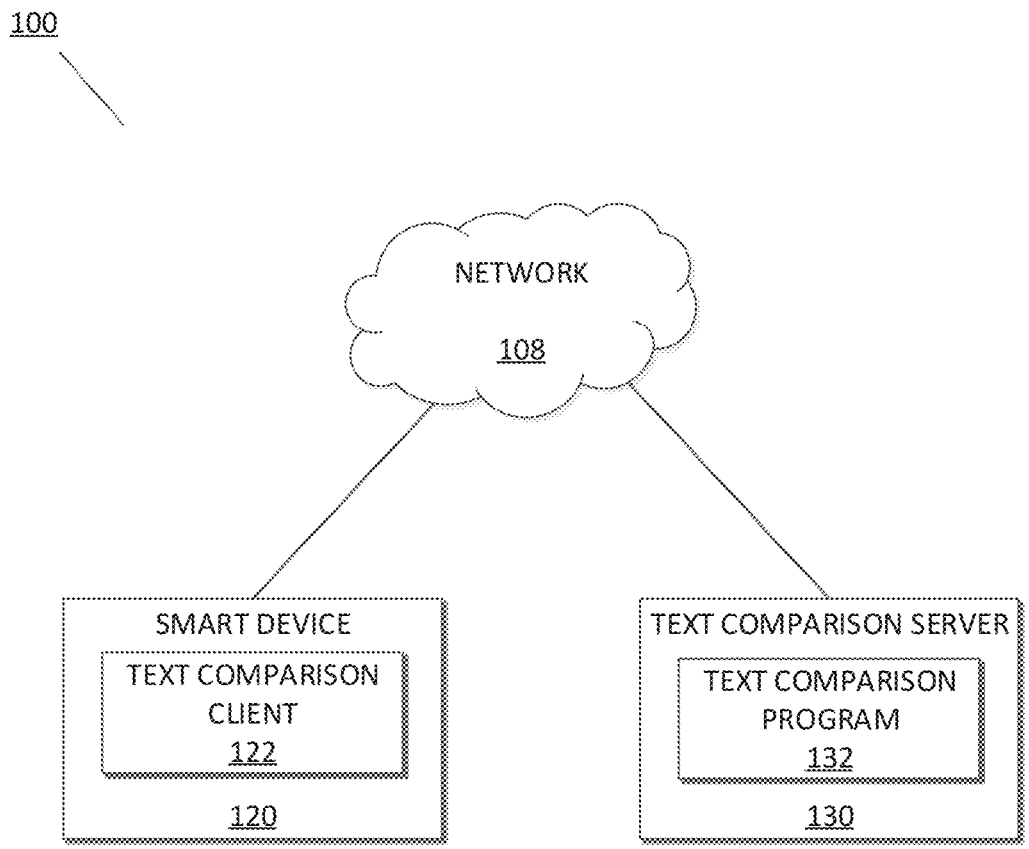
FIG. 1 depicts an exemplary schematic diagram of a unidirectional text comparison system 100, in accordance with the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

Using word embeddings for text comparison in natural language processing (NLP) compares two blocks of text using a cosine similarity mathematical equation and computes a score that is used to describe the difference between the two blocks. Text comparisons may be used any time two documents need to be checked for similarities, e.g., when an HR professional needs to compare a candidate's resume to a job description.

Currently, however, there is no mechanism to compute the text comparison from a unidirectional perspective, i.e., if Text A covers most of the aspects covered in Text B, the overall similarity score is not penalized based on Text B having additional text.

Instead, in the current state of the art, unidirectionality must be manually verified using one or more of several methods. One of such methods requires manually determining whether the text which needs the directionality measure covers the word embedding from the other block of text, and can take several hours to manually compare each keyword embedding combination. Alternatively, another method may be to implement nearest neighbor searches, however nearest neighbor searches may provide false results and do not consider semantic similarity. Lastly, one may manually delete the additional keywords from the text block that do not need directionality before comparing it with the text block that needs to be measured using directionality, which is again not efficient nor cost effective. Thus, each of the aforementioned methods have their flaws.

There is therefore a need to improve cosine similarity determinations such that they calculate a similarity score with consideration of a directionality factor. Proposed herein is an invention that introduces this unidirectionality in the computation of the similarity score, and doesn't penalize the overall score calculated from using the embedding.

Restated, the invention will not penalize a similarity score for Text A having additional keywords over Text B, or vice versa. The present invention implements a mathematical cost function that is built over the similarity score for optimizing that takes into consideration the directionality factor while computing this score.

FIG. 1 depicts the text comparison system 100, in accordance with exemplary embodiments. According to the exemplary embodiments, the text comparison system 100 may include a smart device 120 and a text comparison server 130, which all may be interconnected via a network 108. While programming and data of the exemplary embodiments may be stored and accessed remotely across several servers via the network 108, programming and data of the exemplary embodiments may alternatively or additionally be stored locally on as few as one physical computing device or amongst other computing devices than those depicted. The operations of the text comparison system 100 are described in greater detail herein.

In the exemplary embodiments, the network 108 may be a communication channel capable of transferring data between connected devices. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc., which may be implemented as an intranet network, a local area network (LAN), a wide area network (WAN), a combination thereof, etc. In further embodiments, the network 108 may be a Bluetooth network, a Wi-Fi network, a combination thereof, etc. The network 108 may operate in frequencies including 2.4 gHz and 5 gHz internet, near-field communication, etc. In yet further embodiments, the network 108 may be a telecommunications network used to facilitate telephone calls between two or more parties comprising a landline network, a wireless network, a closed network, a satellite network, a combination thereof, etc. In general, the network 108 may represent any combination of connections and protocols that will support communications between connected devices.

In exemplary embodiments, the smart device 120 includes a text comparison client 122, and may be an enterprise server, a laptop computer, a notebook, a tablet computer, a netbook computer, a personal computer (PC), a desktop computer, a server, a personal digital assistant (PDA), a smart phone, a mobile phone, a virtual device, a thin client, an IoT device, or any other electronic device or computing system capable of sending and receiving data to and from other computing devices. While the smart device 120 is shown as a single device, in other embodiments, the smart device 120 may be comprised of a cluster or plurality of computing devices, in a modular manner, etc., working together or working independently. The smart device 120 is described in greater detail as a hardware implementation with reference to FIG. 4, as part of a cloud implementation with reference to FIG. 5, and/or as utilizing functional abstraction layers for processing with reference to FIG. 6.

The text comparison client 122 may act as a client in a client-server relationship, e.g., with the text comparison server 130, and may be a software and/or hardware application capable of communicating with and providing a user interface for a user to interact with the text comparison server 130 and other computing devices via the network 108. Moreover, the text comparison client 122 may be further capable of transferring data from the smart device 120 to and from other devices via the network 108. In embodiments, the text comparison client 122 may utilize various wired and wireless connection protocols for data transmission and exchange, including Bluetooth, 2.4 gHz and 5 gHz internet, near-field communication (NFC), etc. The text comparison client 122 is described in greater detail with respect to FIG. 2-6.

In exemplary embodiments, the text comparison server 130 includes the text comparison program 132, and may act as a server in a client-server relationship with the text comparison client 122. The text comparison server 130 may be an enterprise server, a laptop computer, a notebook, a tablet computer, a netbook computer, a personal computer (PC), a desktop computer, a server, a personal digital assistant (PDA), a smart phone, a mobile phone, a virtual device, a thin client, an IoT device, or any other electronic device or computing system capable of sending and receiving data to and from other computing devices. While the text comparison server 130 is shown as a single device, in other embodiments, the text comparison server 130 may be comprised of a cluster or plurality of computing devices, in a modular manner, etc., working together or working independently. The text comparison server 130 is described in greater detail as a hardware implementation with reference to FIG. 4, as part of a cloud implementation with reference to FIG. 5, and/or as utilizing functional abstraction layers for processing with reference to FIG. 6.

The text comparison program 132 may be a software and/or hardware program that may receive documents to be compared and a directionality input. The text comparison program 132 may further parse Text A and Text B text blocks within the documents, as well as perform data cleaning, pre-processing, and tokenization of Text A and Text B. The text comparison program 132 may additionally identify tokens within Text A and Text B that have corresponding word embeddings from a word to vector (W2V) model trained by a domain corpus, and calculate a cosine similarity score between Text A and Text B using the W2V model. The text comparison program 132 may compute an overlap and a symmetric difference of tokens between Text A and Text B, as well as compute error terms for the overlapping and non-overlapping tokens. The text comparison program 132 may compute a new error term as well as a new similarity score before receiving user leverage of the new score. The text comparison program 132 is described in greater detail with reference to FIG. 2-6.

Figure 2A:
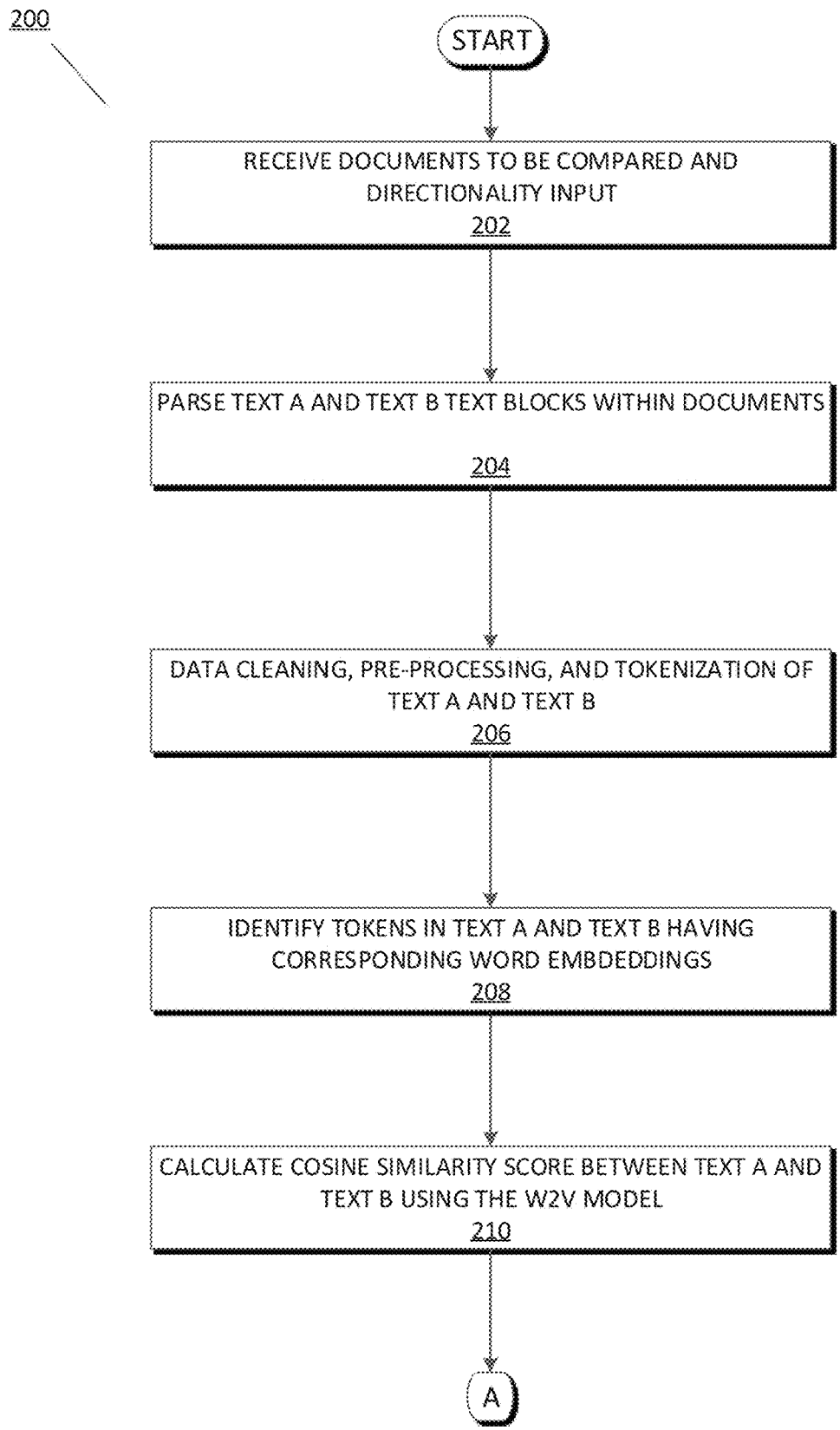
FIG. 2A-B depict an exemplary flowchart 200 illustrating a text comparison program 132 of the unidirectional text comparison system 100, in accordance with the exemplary embodiments.
Figure 2B:
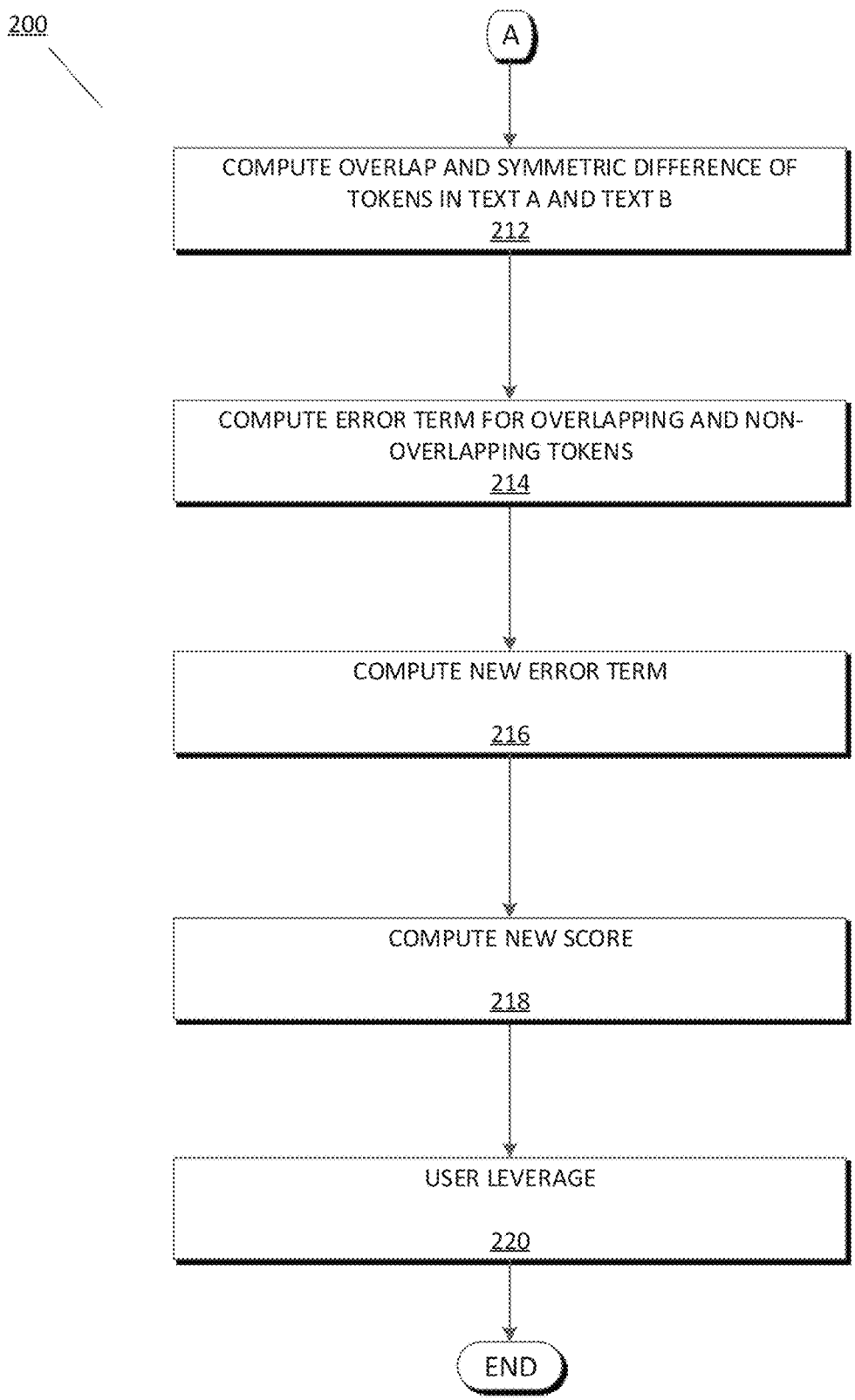

FIG. 2A-B depict an exemplary flowchart 200 illustrating the operations of the text comparison program 132 of the text comparison system 100, in accordance with the exemplary embodiments. In embodiments, the text comparison program 132 may first be pre-trained on a domain corpus of the user. The corpus of data could be customized as per the domain of the use case or as per the requirement of the user. For example, if it's a human resources (HR) based system of a company, the corpus of data may detail technical and non-technical skills. If the domain is for a banking and finance industry, corpus of data could cover all terminologies within banking, etc. The text comparison program 132 may train a custom word-to-vector (Word2Vec, W2V) model on the domain corpus of the user after performing natural language processing (NLP) data pre-processing and cleaning tasks on the domain corpus. The W2V model may compute a semantic similarity and/or a cosine similarity between the two blocks of texting using a baseline cosine similarity model, e.g., the Gensim's N-similarity model.

The text comparison program 132 may receive one or more documents to be compared and a directionality input (step 202). In embodiments, the text comparison program 132 may receive user input uploading or linking documents having blocks of text which are to be compared unidirectionally via the text comparison client 122. In some embodiments, a user may further indicate the specific segments text from which to extract text blocks, e.g., Text A and Text B, via the text comparison client 122. The user may additionally enter into the text comparison client 122 a directionality input indicating a direction in which the blocks of text are to be compared, e.g., left to right or right to left, up to down or down to up, etc.

In order to better illustrate the operations of the text comparison program 132, reference is now made to an illustrative example wherein text comparison program 132 receives documents comprising a resume and a job description for unidirectional text comparison. Here, a user may be utilizing the text comparison program 132 in order to determine whether a candidate is qualified for a position, however wishes not to reduce a similarity score of a candidate for listing more qualifications on their resume than those listed by the job description.

The text comparison program 132 may parse Text A and Text B text blocks within the documents (step 204). The text comparison program 132 may parse the documents and extract logical blocks of texts from the documents, resulting in a block of text (Text A) from one of the documents and another block of text (Text B) from the other document. The parsing, e.g., a syntax parse, may for each of the text blocks build a data structure, e.g. a parse tree, abstract syntax tree, or other hierarchical structure, giving a structural representation of the blocks while checking for correct syntax.

Furthering the illustrative example introduced above, the text comparison program 132 parses the candidate resume and job description in order to extract logical block Text A from the candidate resume and logical block Text B from the job description.

The text comparison program 132 may perform data cleaning, pre-processing, and tokenization of Text A and Text B (step 206). In embodiments, the text comparison program 132 may perform NLP pre-processing steps like removal of stop words, punctuations, single character tokens, etc., before being passed through the cosine similarity function. The pre-processing may include processes such as data cleansing, data editing, data reduction, and data wrangling. The text comparison program 132 may further tokenize the blocks of text to be compared using a tokenization program, e.g., Flashtext2.

With reference again to the formerly introduced example, the text comparison program 132 may remove stop words, e.g., a, the, so, etc., as well as any punction such as etc., from the resume text or job description to ensure it only computes a similarity of relevant tokens.

The text comparison program 132 may identify tokens in Text A and Text B having corresponding word embeddings (step 208). The tokens may be identified from a word-to-vector model trained by the domain corpus previously discussed. In particular, the text comparison program 132 may pass the tokens through the W2V model to determine whether Text A meets the semantic requirements for Text B by computing a similarity score between.

In the aforementioned example that included comparing the candidate resume and the job description, the text comparison program 132 may identify the tokens [Java, DevOps, Communication] in the resume and the tokens [C++, DevOps] in job description.

The text comparison program 132 may calculate a cosine similarity score between the tokens of Text A and the tokens of Text B using the W2V model (step 210). The text comparison program 132 may compute cosine similarity score between the two blocks of texts Text A and Text B using the custom word-to-vector model described above and the N-Similarity model function to compute a similarity score, or Cosine Similarity Score, that is outputted as S1. Cosine similarity measures the similarity between two vectors of an inner product space. It is measured by the cosine of the angle between two vectors and determines whether two vectors are pointing in roughly the same direction Returning to the formerly introduced example, the text comparison program 132 may compute a cosine similarity score S1 of 0.85.

The text comparison program 132 may introduce directionality by adding an error term that compensates for a lack of directionality in the current computation of the similarity score, S1. The text comparison program 132 may add the error term to ensure Text A is not penalized for having additional text than what is required to meet semantic requirements of Text B, or vice versa.

Introducing the error term, INT, may first require that the text comparison program 132 identify token overlap and symmetric difference between Text A and Text B (step 212). The text comparison program 132 may identify an overlap of tokens as the tokens that appear in both Text A and Text B. Conversely, the text comparison program 132 may identify a symmetric difference of tokens as tokens that appear in either of Text A or Text B, but not both.

Figure 3:
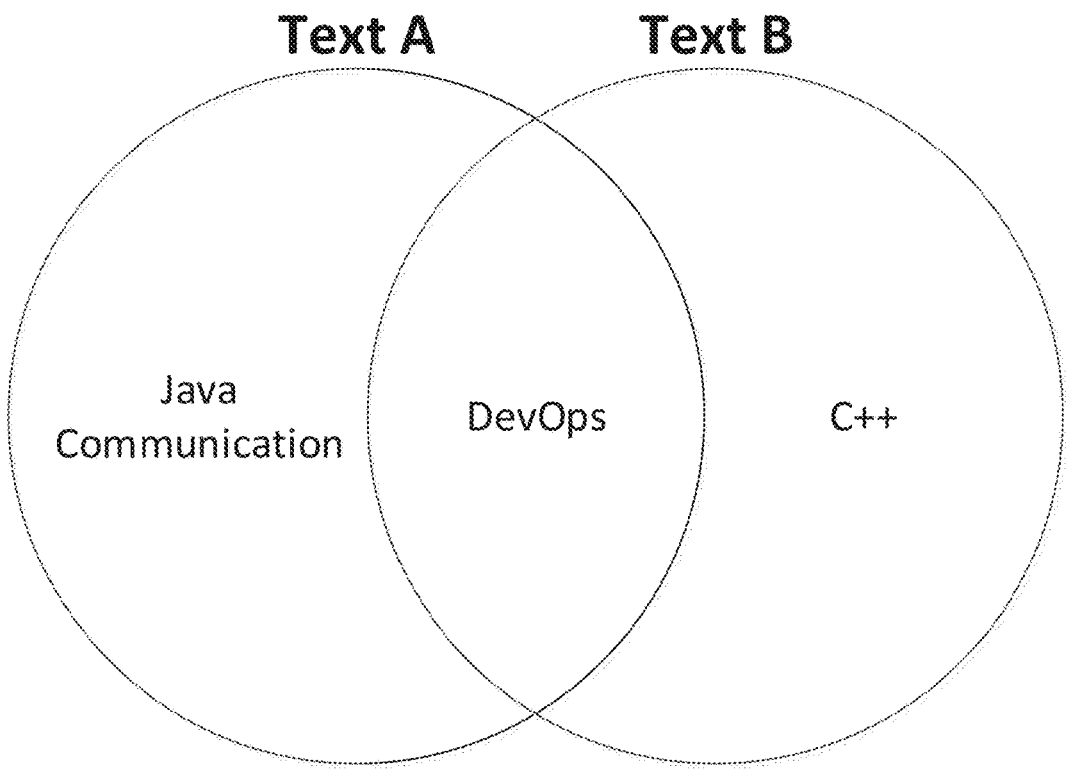
FIG. 3 depicts a Venn diagram illustrating token overlap and symmetric difference.

Continuing the aforementioned example, the Venn diagram in FIG. 3 illustrates overlapping and non-overlapping (symmetric differences) of tokens in Text A and Text B.

The text comparison program 132 may compute an error term for each of the overlapping and non-overlapping tokens (step 214). In embodiments, the error term INT may comprise both an error term for overlapping tokens between Text A and Text B, OVR, as well as another error term for non-overlapping tokens between Text A and Text B, NON_OVR. The text comparison program 132 may compute OVR using Eq. 1:

$$OVR = \frac{\text{count (intersection of tokens in Text } A \text{ and Text } B)}{\text{count (unique tokens in Text } A \text{ and Text } B)} \times 1$$

Where the 1 represents a similarity between the overlapping tokens, which here will always be 1.

The text comparison program 132 may additionally compute an error term for the non-overlapping tokens using a symmetric difference. The text comparison program 132 may compute NON_OVR using Eq. 2:

$$NON_{OVR} =$$

$$\frac{\text{count (symmetric difference of tokens in Text } A \text{ and Text } B)}{\text{count (unique tokens in Text } A \text{ and Text } B)} \times$$

$$N_{Similarity}(\text{non-overlapping tokens in Text } A \text{ and Text } B)$$

Where Eq. 2 uses the Gensim N Similarity Model.

In the aforementioned example regarding candidate resume and job description documents, the text comparison program 132 computes an OVR of 0.25 and a NON_OVR of 0.637.

The text comparison program 132 may compute a new error term (step 216). In embodiments, the error term INT is computed as the sum of the OVR and the NON_OVR using Eq. 3:

INT=OVR+NON_OVR

Or, in full notation, Eq. 4:

$$INT = \frac{\text{len}(A \cap B)}{\text{len}(\text{set}(A \cup B))} \times 1 + \frac{\text{len}(A \Delta B)}{\text{len}(\text{set}(A \cup B))} \times N_{Similarity}(A_N, B_N)$$

where:

$$A_N = A - (A \cap B)$$

$$B_N = B - (A \cap B)$$

With reference to the example described above, the text comparison program 132 computes an INT of 0.887.

The text comparison program 132 may compute a new similarity score (step 218). When computing the new similarity score, the text comparison program 132 may implement a constant α, which is between 0 and 1, with the error term INT that rewards the similarity score S1 for the similarity between Text A and Text B, as well as factors in Text A meeting semantic requirement for Text B. The constant α may additionally be used to facilitate application of the model across multiple use cases. The new score may be computed via Eq. 5:

New Score=$S1+[\alpha(1-S1)]\times INT$

Or, in full notation, by Eq. 6:

$$\text{New Score} = N_{Similarity}(A, B) + [\alpha(1 - N_{Similarity}(A, B)] \times \left[\frac{\text{len}(A \cap B)}{\text{len}(\text{set}(A \cup B))} \times 1 + \frac{\text{len}(A \Delta B)}{\text{len}(\text{set}(A \cup B))} \times N_{Similarity}(A_N, B_N)\right]$$

Where:
   $N_{Similarity}$(A, B): semantic similarity between tokens from Text A and Text B
   α: constant between 0-1
   (A∪B): tokens that are in both Text A and Text B (intersection)
   (A∩B): tokens that are in Text A or Text B (union)
   (AΔB): tokens that are in either of Text A or Text B but not both (symmetric difference)

Returning again to the previously introduced example, the text comparison program 132 may compute a new score of 0.903 (when α=0.4).

The text comparison program 132 may receive user input leveraging the new score (step 220). The new score, which considers directionality and rewards the original cosine similarity score (N-similarity), is more standardized and regularized in comparison to a penalized original score provided by cosine similarity alone. The user can now use the similarity score with the directionality generated by the system for additional purposes and modelling use cases. This new similarity score, as described above, will be a more accurate representation of a similarity between two blocks of text that does not penalize for one block having additional text through the use of directionality.

Concluding the aforementioned example, the text comparison program 132 outputs a new similarity score of 0.903 after factoring directionality, thereby not penalizing the candidate for additionally having Java and Communication listed within their resume.

FIG. 3 depicts a Venn diagram illustrating token overlap and symmetric difference.

Figure 4:
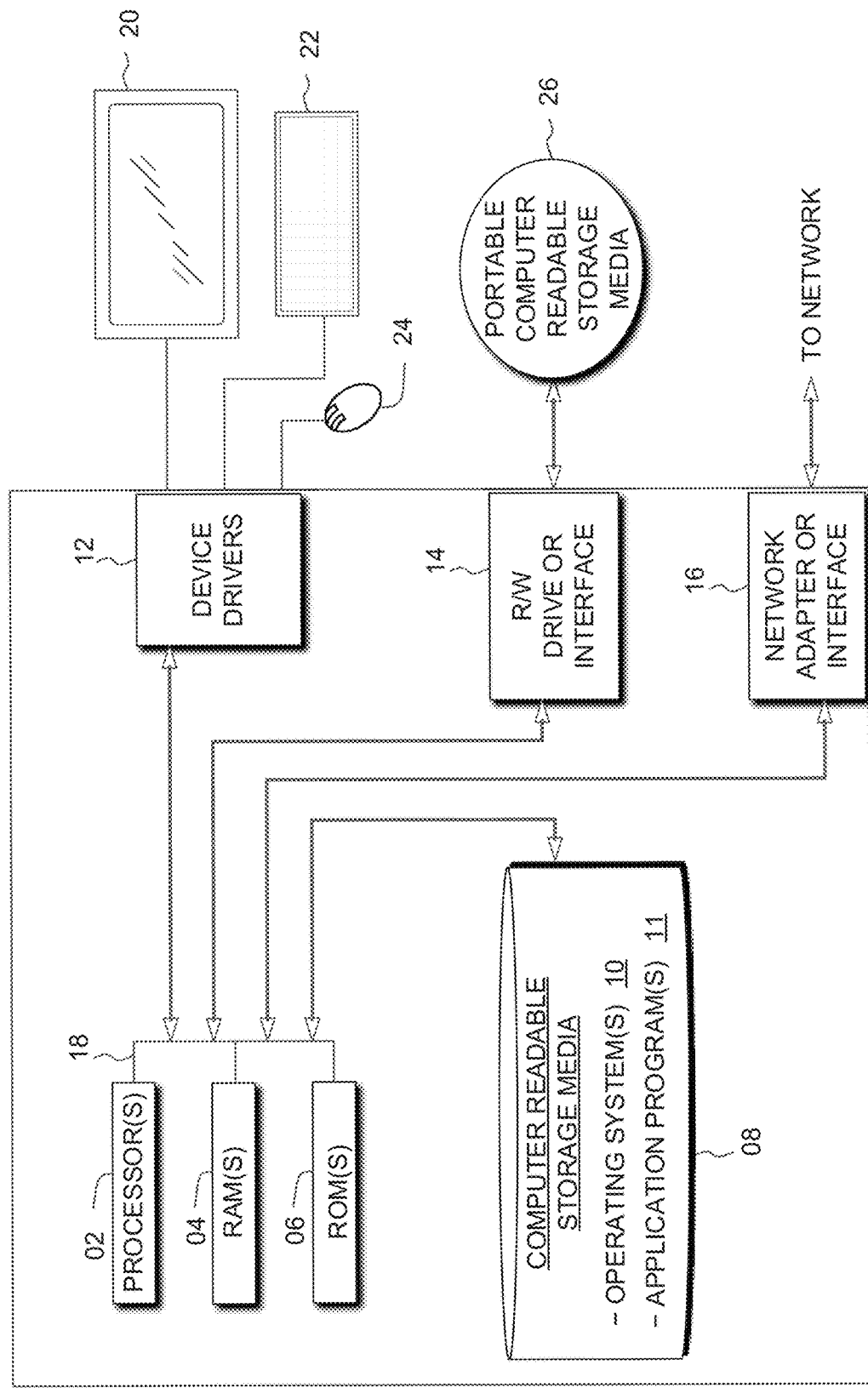
FIG. 4 depicts an exemplary block diagram depicting the hardware components of the unidirectional text comparison system 100 of FIG. 1, in accordance with the exemplary embodiments.

FIG. 4 depicts a block diagram of devices used within text comparison system 100 of FIG. 1, in accordance with the exemplary embodiments. It should be appreciated that FIG. 4 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
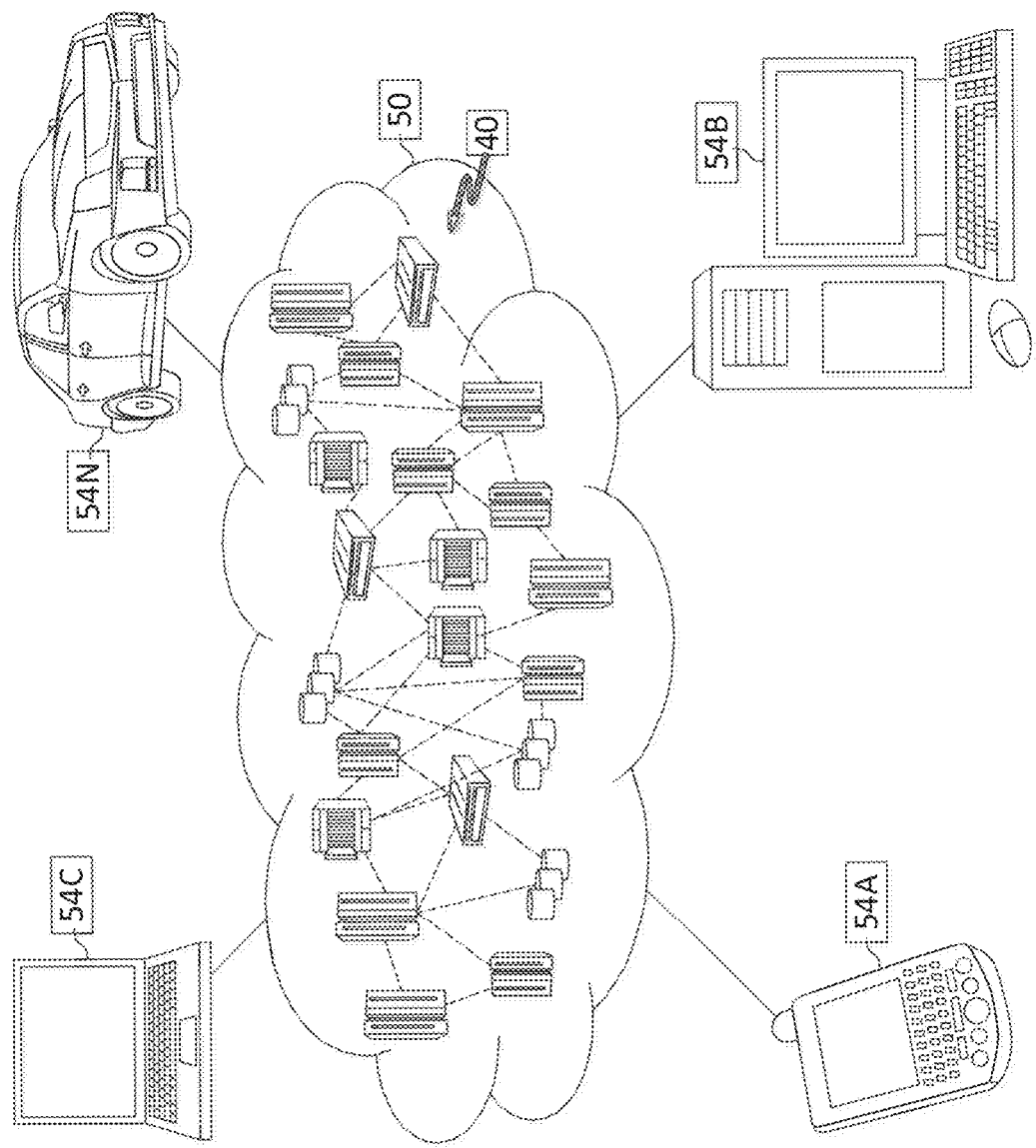
FIG. 5 depicts a cloud computing environment, in accordance with the exemplary embodiments.

Referring now to FIG. 5, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 40 and cloud computing environment 50 can communicate with any type of computerized device over any type of network and/or network addressable connection (e.g., using a web browser).

Figure 6:
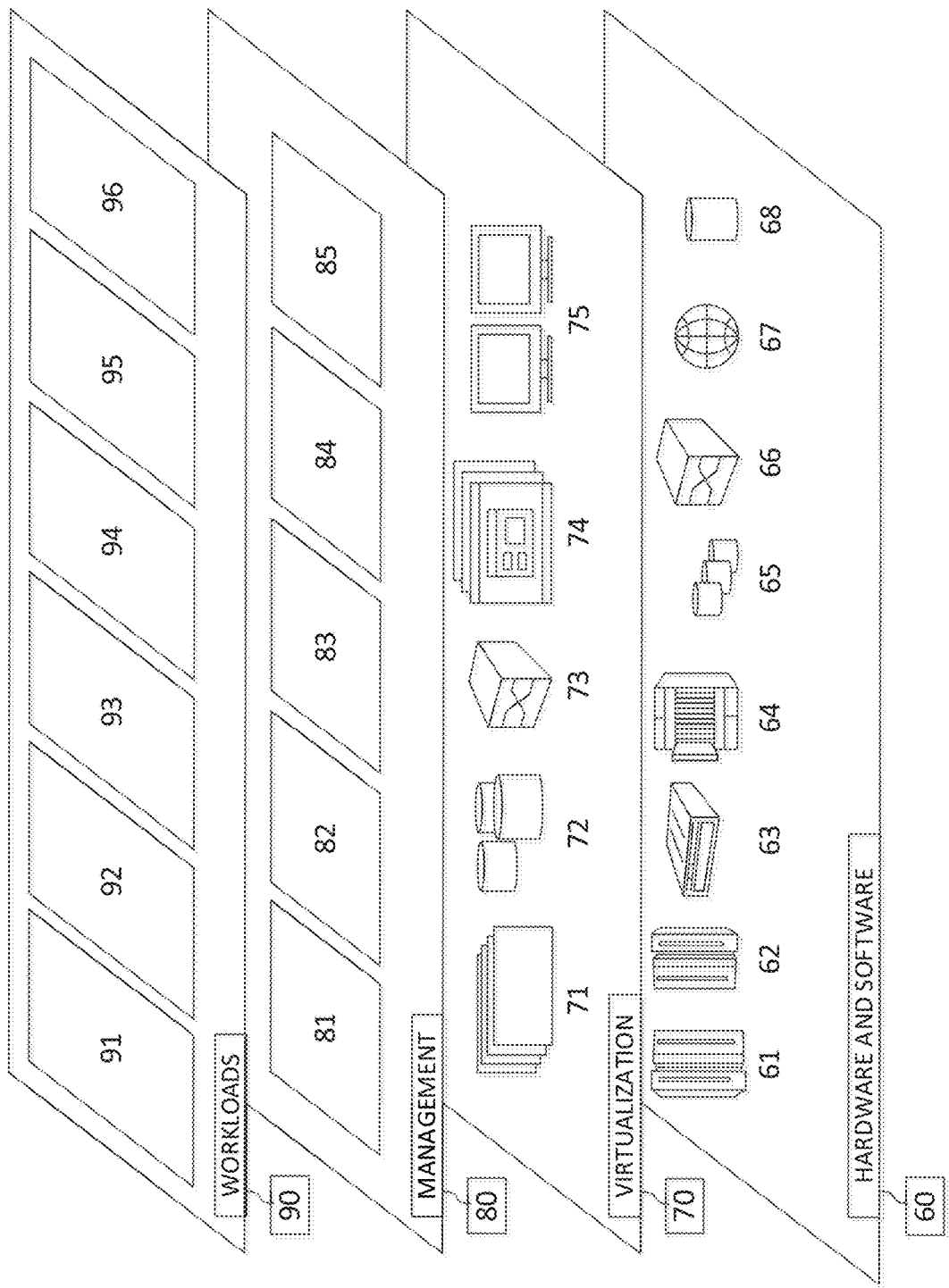
FIG. 6 depicts abstraction model layers, in accordance with the exemplary embodiments.

Referring now to FIG. 6, a set of functional abstraction layers provided by cloud computing environment 50 (FIG. 5) is shown. It should be understood in advance that the components, layers, and functions shown in FIG. 6 are intended to be illustrative only and the exemplary embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and text comparison processing 96.

The exemplary embodiments may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for unidirectional text comparison, the method comprising:
   determining a first similarity score between a first text string and a second text string;
   computing an error term between the first text string and the second text string, wherein the error term incorporates a directionality of the first text string and the second text string;
   determining a second similarity score based on the first similarity score and the error term.

2. The computer-implemented method of claim 1, wherein determining the first similarity score further comprises:
   training a word to vector model using a domain of interest;
   tokenizing the first text string and the second text string; and
   calculating a cosine difference between the first text string and the second text string based on the word to vector model.

3. The computer-implemented method of claim 2, wherein computing the error term further comprises:
   tokenizing the first text string and the second text string;
   determining an overlap and a symmetric difference of tokens within the first text string and the second text string;
   computing an overlap error term for the overlap and a non-overlap error term for the symmetric difference; and
   summing the overlap error term and the non-overlap error term.

4. The computer-implemented method of claim 1, wherein determining the second similarity score further incorporates a constant.

5. The computer-implemented method of claim 1, wherein the second similarity score is not penalized based on the first text string having additional text over the second text string and vice versa.

6. The computer-implemented method of claim 1, further comprising:
   pre-processing the first text string and the second text string.

7. The computer-implemented method of claim 1, wherein the first text string is parsed from a first document and the second text string is parsed from a second document.

8. A computer program product for unidirectional text comparison, the computer program product comprising:
   one or more non-transitory computer-readable storage media and program instructions stored on the one or more non-transitory computer-readable storage media capable of performing a method, the method comprising:
   determining a first similarity score between a first text string and a second text string;
   computing an error term between the first text string and the second text string, wherein the error term incorporates a directionality of the first text string and the second text string;
   determining a second similarity score based on the first similarity score and the error term.

9. The computer program product of claim 8, wherein determining the first similarity score further comprises:
   training a word to vector model using a domain of interest;
   tokenizing the first text string and the second text string; and
   calculating a cosine difference between the first text string and the second text string based on the word to vector model.

10. The computer program product of claim 9, wherein computing the error term further comprises:
    tokenizing the first text string and the second text string;
    determining an overlap and a symmetric difference of tokens within the first text string and the second text string;
    computing an overlap error term for the overlap and a non-overlap error term for the symmetric difference; and
    summing the overlap error term and the non-overlap error term.

11. The computer program product of claim 8, wherein determining the second similarity score further incorporates a constant.

12. The computer program product of claim 8, wherein the second similarity score is not penalized based on the first text string having additional text over the second text string and vice versa.

13. The computer program product of claim 8, further comprising:
    pre-processing the first text string and the second text string.

14. The computer program product of claim 8, wherein the first text string is parsed from a first document and the second text string is parsed from a second document.

15. A computer system for unidirectional text comparison, the system comprising:
- one or more computer processors, one or more computer-readable storage media, and program instructions stored on the one or more of the computer-readable storage media for execution by at least one of the one or more processors capable of performing a method, the method comprising:
- determining a first similarity score between a first text string and a second text string;
- computing an error term between the first text string and the second text string, wherein the error term incorporates a directionality of the first text string and the second text string;
- determining a second similarity score based on the first similarity score and the error term.

16. The computer system of claim 15, wherein determining the first similarity score further comprises:
- training a word to vector model using a domain of interest;
- tokenizing the first text string and the second text string; and
- calculating a cosine difference between the first text string and the second text string based on the word to vector model.

17. The computer system of claim 16, wherein computing the error term further comprises:
- tokenizing the first text string and the second text string;
- determining an overlap and a symmetric difference of tokens within the first text string and the second text string;
- computing an overlap error term for the overlap and a non-overlap error term for the symmetric difference; and
- summing the overlap error term and the non-overlap error term.

18. The computer system of claim 15, wherein determining the second similarity score further incorporates a constant.

19. The computer system of claim 15, wherein the second similarity score is not penalized based on the first text string having additional text over the second text string and vice versa.

20. The computer system of claim 15, further comprising:
- pre-processing the first text string and the second text string.

* * * * *